US012531001B2

(12) United States Patent
Jeon et al.

(10) Patent No.: US 12,531,001 B2
(45) Date of Patent: Jan. 20, 2026

(54) APPARATUS AND METHOD FOR INSPECTING EXTERNAL APPEARANCE OF PRODUCT

(71) Applicant: LG Energy Solution, Ltd., Seoul (KR)

(72) Inventors: Hyoseung Jeon, Daejeon (KR); Tae Young Kim, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 0 days.

(21) Appl. No.: 18/855,149

(22) PCT Filed: Sep. 18, 2023

(86) PCT No.: PCT/KR2023/014038
§ 371 (c)(1),
(2) Date: Oct. 8, 2024

(87) PCT Pub. No.: WO2024/063471
PCT Pub. Date: Mar. 28, 2024

(65) Prior Publication Data

US 2025/0252884 A1 Aug. 7, 2025

(30) Foreign Application Priority Data

Sep. 19, 2022 (KR) ........................ 10-2022-0117571
Jul. 31, 2023 (KR) ........................ 10-2023-0099316

(51) Int. Cl.
*G09G 3/20* (2006.01)
*G09G 3/30* (2006.01)

(52) U.S. Cl.
CPC ............. *G09G 3/2003* (2013.01); *G09G 3/30* (2013.01); *G09G 2320/0233* (2013.01); (Continued)

(58) Field of Classification Search
CPC .................................................... G09G 3/2003
See application file for complete search history.

(56) References Cited

U.S. PATENT DOCUMENTS 6,865,288 B1 3/2005 Shishido et al.
2002/0094120 A1 7/2002 Hiroi et al.
(Continued)

FOREIGN PATENT DOCUMENTS

JP H0914934 A 1/1997
JP H09264728 A 10/1997
(Continued)

OTHER PUBLICATIONS

JP 2021-131359 A translation (Year: 2025).*
(Continued)

*Primary Examiner* — Gustavo Polo
(74) *Attorney, Agent, or Firm* — Lerner David LLP

(57) ABSTRACT

An appearance inspection method of a product according to embodiments of the present invention may include obtaining and pre-processing an image of appearance of a target object; pre-processing the image; extracting a region of interest from the preprocessed image and obtaining a brightness-corrected image by performing brightness correction on the extracted region of interest; extracting defective candidates from the brightness-corrected image; obtaining a post-processed image by post-processing the extracted defective candidates; and determining whether the target object is defective based on the post-processed image.

15 Claims, 14 Drawing Sheets contamination size deviation
comparison of detection size vs. contamination size measured by microscope

- effect of reducing deviation level when gray correction ON
- range of 64 to 192 is appropriate usage range

(52) U.S. Cl.
CPC . *G09G 2320/0646* (2013.01); *G09G 2330/10* (2013.01); *G09G 2354/00* (2013.01)

(56) References Cited

U.S. PATENT DOCUMENTS

| | | | |
|---|---|---|---|
| 2005/0147287 | A1 | 7/2005 | Sakai et al. |
| 2013/0322735 | A1 | 12/2013 | Tamura et al. |
| 2021/0018446 | A1 | 1/2021 | Terahai et al. |

FOREIGN PATENT DOCUMENTS

| | | | |
|---|---|---|---|
| JP | H1089931 | A | 4/1998 |
| JP | 2001022935 | A | 1/2001 |
| JP | 2005158780 | A | 6/2005 |
| JP | 2005285898 | A | 10/2005 |
| JP | 2009294087 | A | 12/2009 |
| JP | 2010066126 | A | 3/2010 |
| JP | 2013250082 | A | 12/2013 |
| JP | 2021131359 | A | 9/2021 |
| JP | 2021156629 | A | 10/2021 |
| KR | 20220060080 | A | 5/2022 |
| WO | 2019216031 | A1 | 11/2019 |

OTHER PUBLICATIONS

Extended European Search Report including Written Opinion for Application No. 23868523.4 dated Apr. 28, 2025, pp. 1-10.
International Search Report for PCT/KR2023/014038 mailed Jan. 12, 2024. 3 pages.

* cited by examiner

[FIG. 6a]
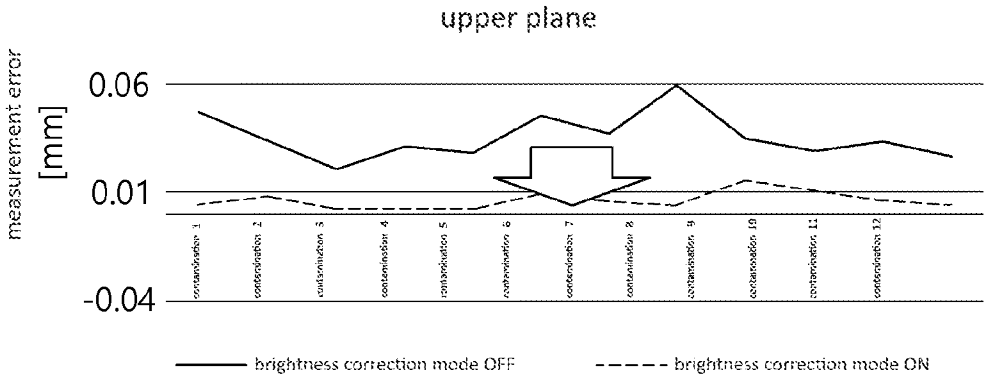
[FIG. 6b]
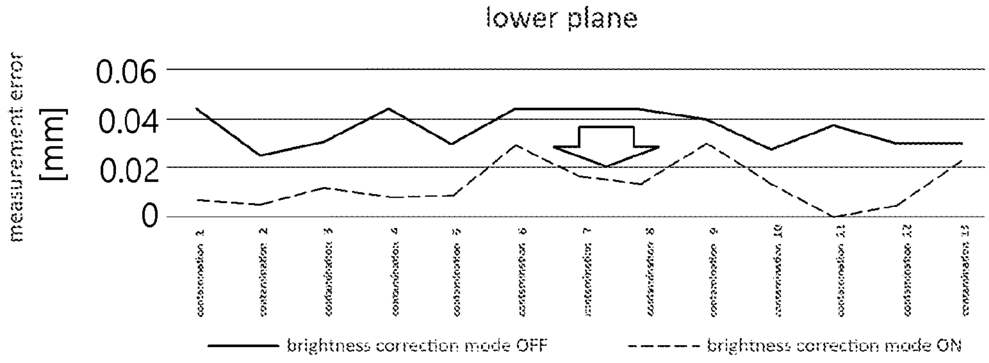

[FIG. 6c]
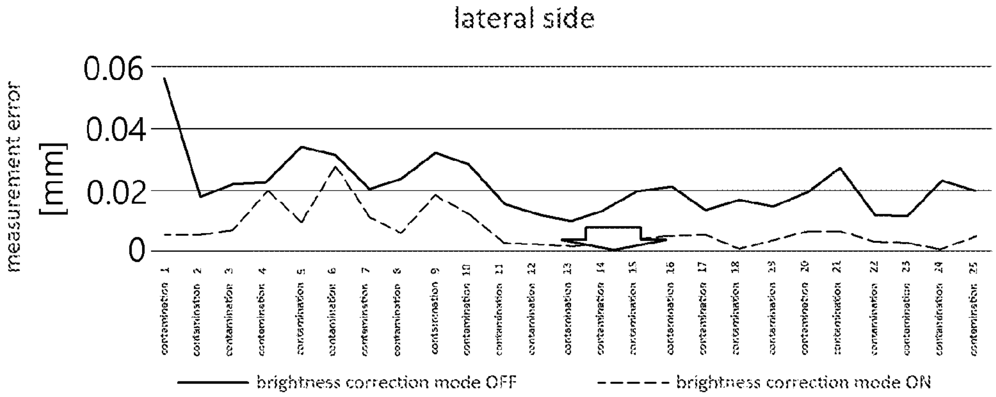

[FIG. 7]
| Target Intensity \ Strobe | 200 $\mu s$ | 400 $\mu s$ | 500 $\mu s$ |
|---|---|---|---|
| OFF | 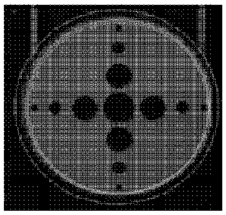 | 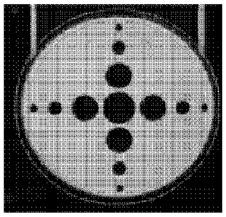 | 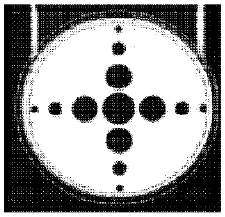 |
| 64 | 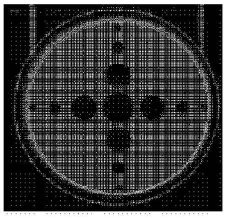 | 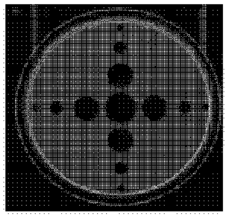 | 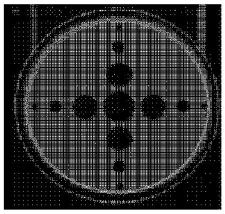 |
| 128 | 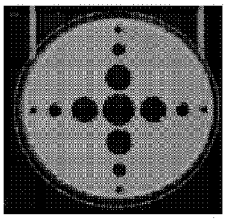 | 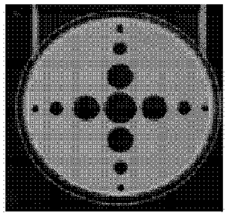 | 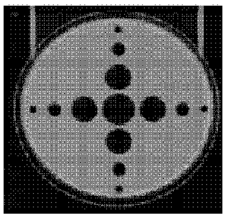 |
| 192 | 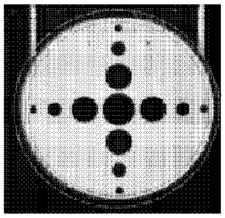 | 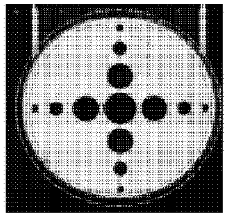 | 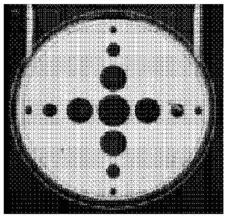 |

[FIG. 8]
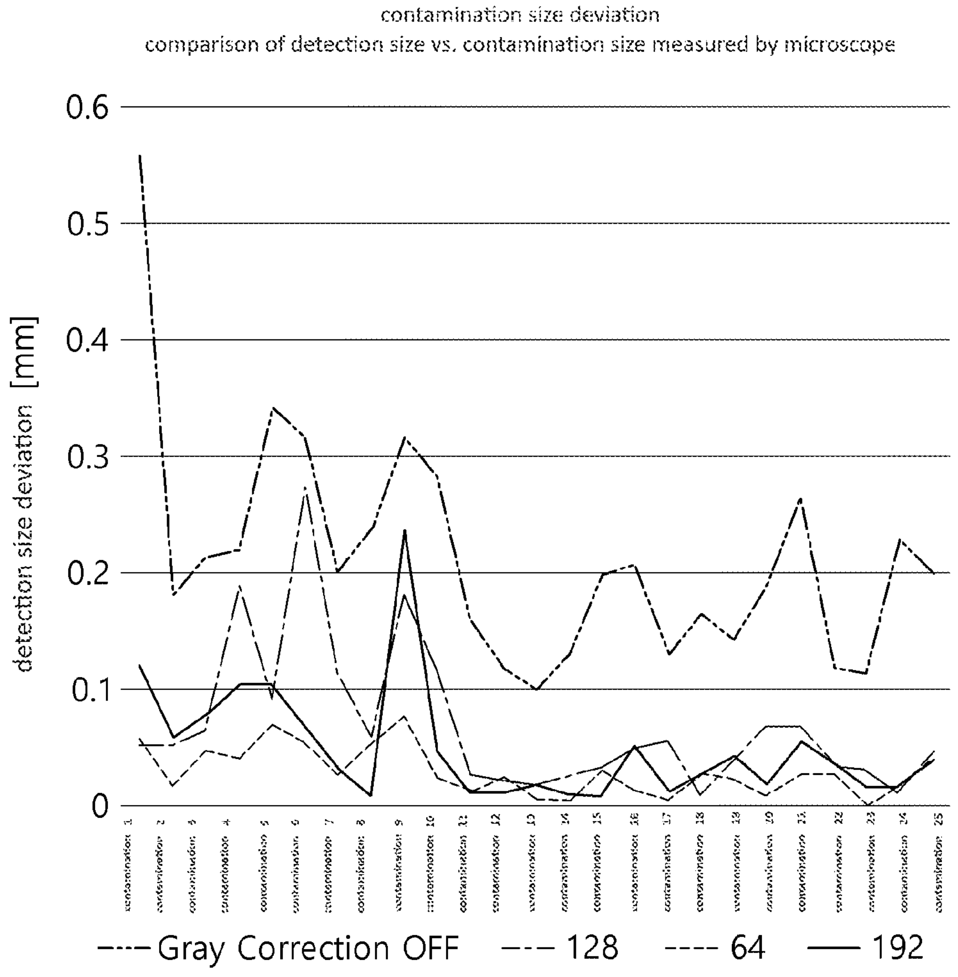
- effect of reducing deviation level when gray correction ON
- range of 64 to 192 is appropriate usage range

[FIG. 9]
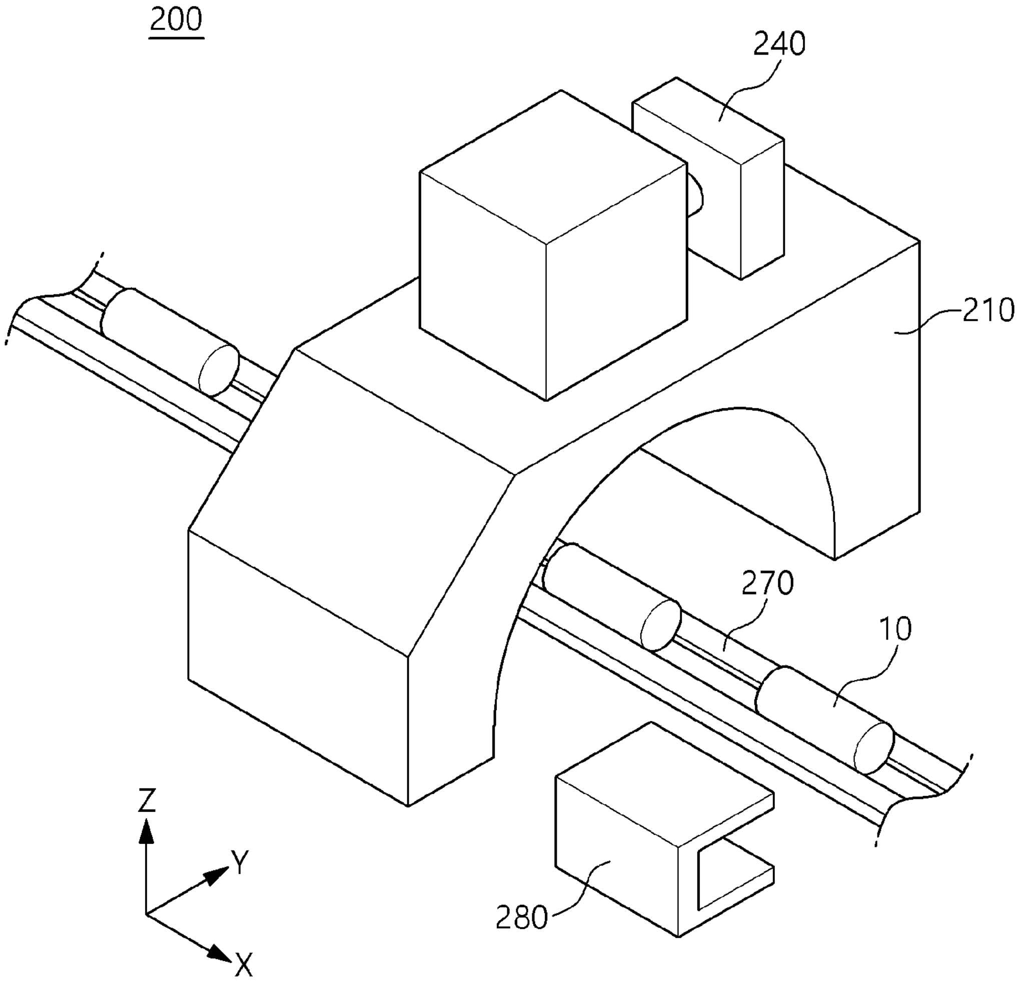

[FIG. 10]
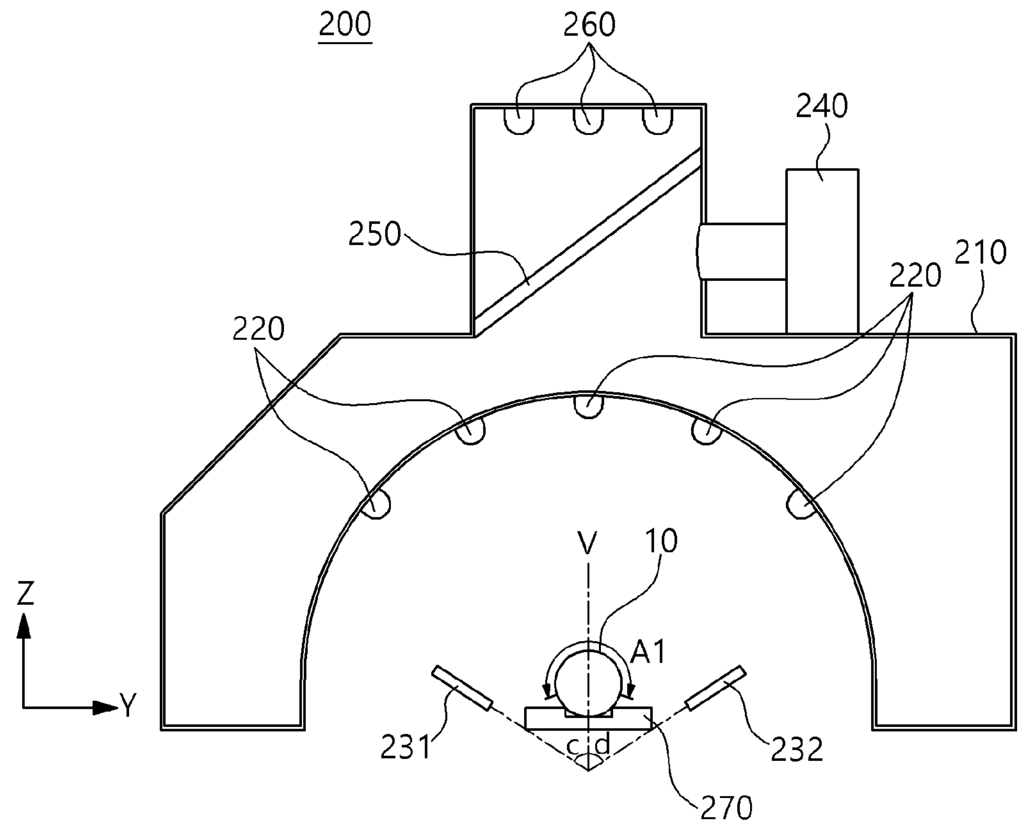

[FIG. 11a]
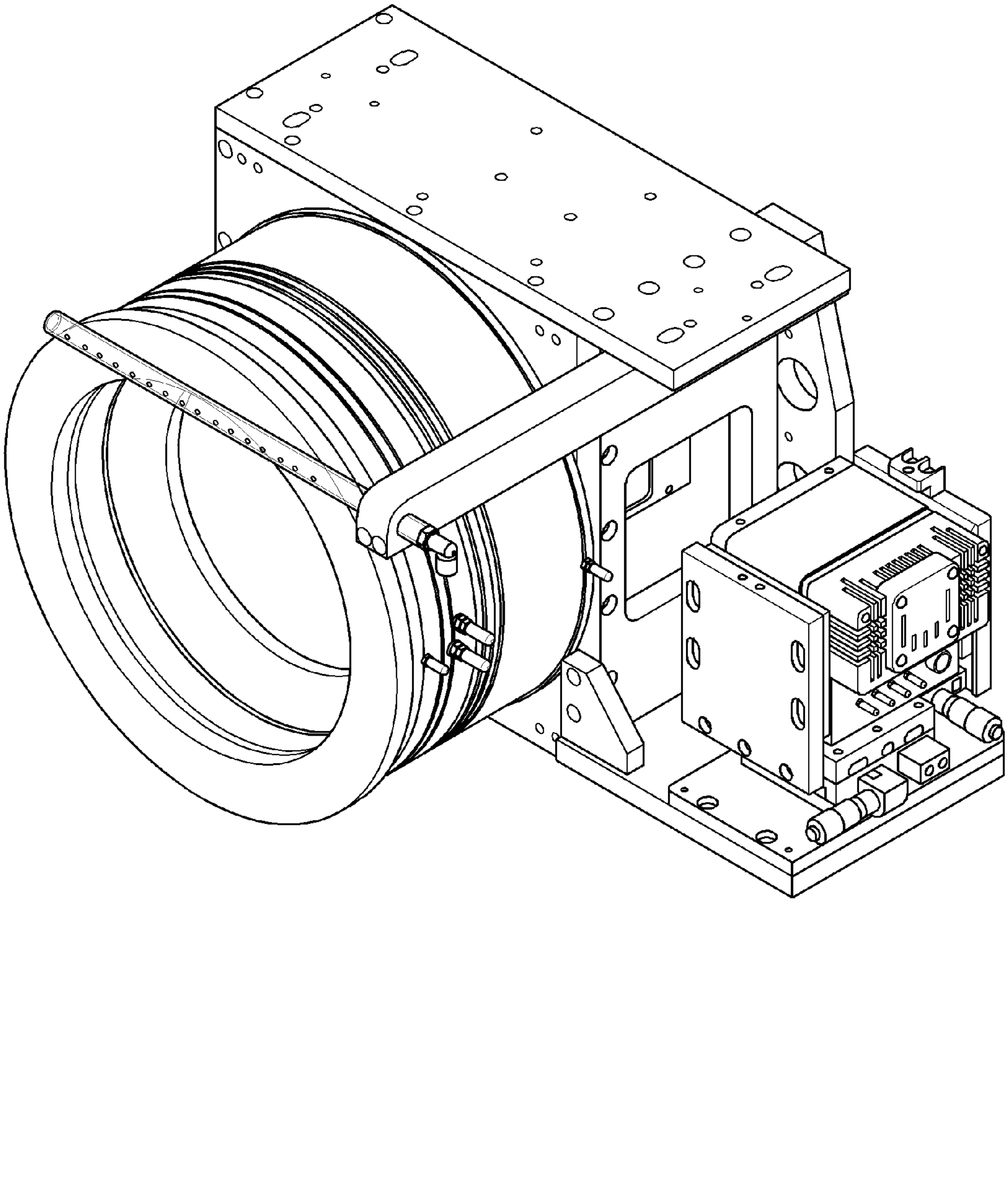

[FIG. 11b]
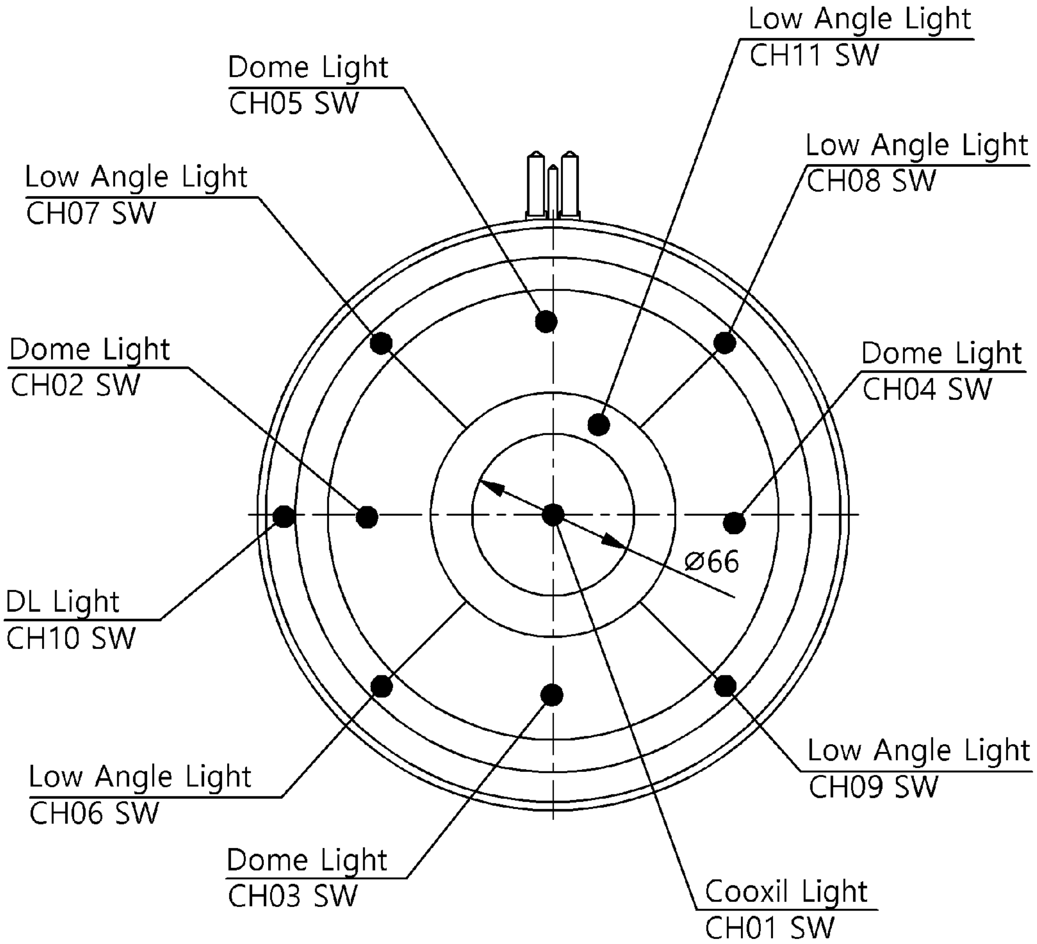

APPARATUS AND METHOD FOR INSPECTING EXTERNAL APPEARANCE OF PRODUCT

CROSS-REFERENCE TO RELATED APPLICATION

The present application is a national phase entry under 35 U.S.C. § 371 of International Application No. PCT/KR2023/014038 filed Sep. 18, 2023, which claims priority from Korean Patent Application No. 10-2022-0117571 filed in the Korean Intellectual Property Office on Sep. 19, 2022 and Korean Patent Application No. 10-2023-0099316 filed in the Korean Intellectual Property Office on Jul. 31, 2023, the entire contents of which are incorporated herein by reference.

TECHNICAL FIELD

The present invention relates to an apparatus and method for inspecting appearance of products, and more particularly, to an apparatus and method for inspecting appearance of products, which processes an inspection image by adjusting brightness of an inspection area in the image.

BACKGROUND

Secondary batteries, capable of recharging and reuse may be used as an energy source for small devices such as mobile phones, tablet PCs, and vacuum cleaners and may also be used as energy source for a medium-to-large devices, such as personal mobility, automobiles, and an energy storage system (ESS) for smart grids. Secondary batteries may used in the form of an assembly such as a battery module in which a plurality of battery cells are connected in series or parallel, or a battery pack in which a plurality of battery modules are connected in series or parallel, depending on the requirements of the system.

Batteries may be manufactured through processes including an electrode process, an assembly process, a formation process, and other processes, and defects are checked for manufactured battery cells or the results of each process using inspection equipment. Among defect inspection methods, one of the commonly used techniques is appearance inspection. The appearance inspection may be done by obtaining images of a product using an optical system and detecting defects using a detection algorithm.

However, the brightness of the obtained image may become different from originally expected brightness of the image due to changes in surface color of the product or changes in lighting due to the end of the life of lighting, after a specific detection algorithm is determined. In this case, a problem arises with the detection ability of the predetermined algorithm.

SUMMARY

Technical Problem

To obviate one or more problems of the related art, embodiments of the present disclosure provide an appearance inspection method of a product that processes an inspection image by adjusting the brightness of the inspection area in the image to a predetermined value.

To obviate one or more problems of the related art, embodiments of the present disclosure also provide an appearance inspection apparatus using the appearance inspection method of a product.

Technical Solution

In order to achieve the objective of the present disclosure, an appearance inspection method of a product may include obtaining an image of appearance of a target object; preprocessing the image; extracting a region of interest from the preprocessed image and obtaining a brightness-corrected image by performing brightness correction on the extracted region of interest; extracting defective candidates from the brightness-corrected image; obtaining a post-processed image by post-processing the extracted defective candidates; and determining whether the target object is defective based on the post-processed image.

Obtaining the brightness-corrected image may include calculating an average brightness of pixels within the extracted region of interest; calculating a correction gain value based on the calculated average brightness and target brightness; and correcting brightness of each pixel according to the correction gain value.

Calculating the correction gain value is performed by dividing the target brightness by the average brightness.

Correcting the brightness of each pixel according to the correction gain value may include multiplying original brightness of each pixel by the correction gain value to correct the brightness of each pixel.

Calculating the average brightness of pixels within the extracted region of interest may include calculating the average brightness based on the number of pixels in the region of interest and brightness of each pixel.

Here, the target brightness may be based on a user input.

The method further comprises changing a captured color image to a gray image before applying the brightness correction to the captured color image.

The method further comprises separating the color image into R channel, G channel, and B channel, before applying brightness correction to a captured color image.

Accordingly, Calculating the average brightness of pixels, calculating the correction gain value, and correcting the brightness of each pixel may be separately performed for each of the R channel, G channel, and B channel.

According to another embodiment of the present disclosure, an appearance inspection apparatus, the apparatus may include at least one processor; and a memory having programmed thereon instructions that, when executed, cause the at least one processor to obtain an image of appearance of a target object; pre-process the image; a extract a region of interest from the preprocessed image and obtain a brightness-corrected image by performing brightness correction on the extracted region of interest; an extract defective candidates from the brightness-corrected image; obtain a post-processed image by performing image post-processing on the extracted defective candidates; and determine whether the target object is defective based on the post-processed image.

The appearance inspection apparatus according to embodiments of the present invention may be configured to communicate with a remote imaging device capturing appearance of the target object, wherein the imaging device is embedded in the appearance inspection apparatus.

The instructions may be further configured to cause the at least one processor to calculate an average brightness of pixels within the extracted region of interest; calculate a correction gain value based on the calculated average brightness and target brightness; and correct brightness of each pixel according to the correction gain value.

The correction gain value is calculated based on dividing the correction gain value by the target brightness by the average brightness.

The brightness of each pixel is corrected by multiplying original brightness of each pixel by the correction gain value. The average brightness of pixels within the extracted region of interest may be calculated based on the average brightness based on a number of pixels in the region of interest and the brightness of each pixel.

Here, the target brightness may be determined by a user.

Meanwhile, the brightness-corrected image is obtained using before applying the brightness correction to a captured color image changed to a gray image.

The instructions may be further configured to cause the at least one processor to separate the color image into R channel, G channel, and B channel, before applying the brightness correction to a captured color image.

Therefore, the average brightness of pixels, the correction gain value, and the brightness of each pixel may be separately obtained for each of the R channel, G channel, and B channel.

Advantageous Effects

According to the embodiment of the present invention as described above, average brightness of an inspection target area (Region of Interest: ROI) is calculated and corrected to a specified brightness, and thus, an image of uniform brightness can be obtained even if lighting situation of an optical system changes.

Therefore, inspection accuracy for determining whether a product is defective can be increased.

BRIEF DESCRIPTION OF THE DRAWINGS

FIGS. 6A to 6C are graphs comparing appearance inspection results using an image with brightness correction according to embodiments of the present invention and an image without brightness correction.

FIG. 7 shows images measured and processed with various illumination intensities and various correction target brightnesses according to embodiments of the present invention.

FIG. 8 is a graph showing detection size deviation between the contamination size detected by performing brightness correction according to the present invention and the inspection result through a microscope.

FIG. 9 is a perspective view of an imaging device according to embodiments of the present invention.

FIG. 10 is a cross-sectional view of an imaging device according to embodiments of the present invention.

FIG. 11A is a diagram showing the appearance of an imaging device according to another embodiment of the present invention.

FIG. 11B is a diagram showing a multi-channel lighting configuration of an imaging device according to another embodiment of the present invention.

Figure 1:
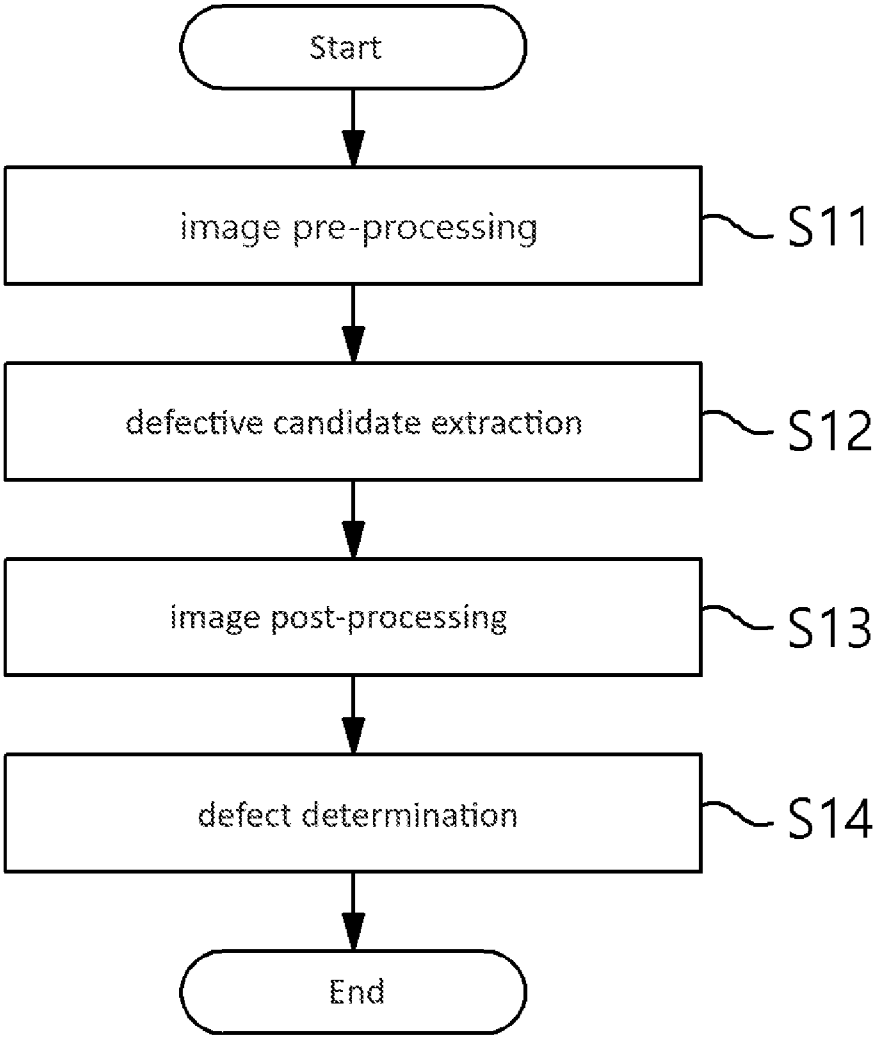
FIG. 1 is an operation flowchart of a general appearance inspection method.

1000: appearance inspection apparatus
1010: processor
1020: memory
1040: input interface
1050: output interface
1060: storage device

DETAILED DESCRIPTION

The present invention may be modified in various forms and have various embodiments, and specific embodiments thereof are shown by way of example in the drawings and will be described in detail below. It should be understood, however, that there is no intent to limit the present invention to the specific embodiments, but on the contrary, the present invention is to cover all modifications, equivalents, and alternatives falling within the spirit and technical scope of the present invention. Like reference numerals refer to like elements throughout the description of the FIG. s.

It will be understood that, although the terms such as first, second, A, B, and the like may be used herein to describe various elements, these elements should not be limited by these terms. These terms are only used to distinguish one element from another. For example, a first element could be termed a second element, and, similarly, a second element could be termed a first element, without departing from the scope of the present invention. As used herein, the term "and/or" includes combinations of a plurality of associated listed items or any of the plurality of associated listed items.

It will be understood that when an element is referred to as being "coupled" or "connected" to another element, it can be directly coupled or connected to the other element or an intervening element may be present. In contrast, when an element is referred to as being "directly coupled" or "directly connected" to another element, there is no intervening element present.

The terms used herein is for the purpose of describing specific embodiments only and are not intended to limit the present invention. As used herein, the singular forms "a", "an" and "the" are intended to include the plural forms as well, unless the context clearly indicates otherwise. It will be further understood that the terms "comprises", "comprising", "includes", "including" and/or "having", when used herein, specify the presence of stated features, integers, steps, operations, constitutional elements, components and/or combinations thereof, but do not preclude the presence or addition of one or more other features, integers, steps, operations, constitutional elements, components, and/or combinations thereof.

Unless otherwise defined, all terms used herein, including technical and scientific terms, have the same meanings as commonly understood by one skilled in the art to which the present invention belongs. It will be further understood that terms, such as those defined in commonly used dictionaries, should be interpreted as having meanings that are consistent with their meanings in the context of the relevant art and will not be interpreted in an idealized or overly formal sense unless expressly so defined herein.

Hereinafter, exemplary embodiments of the present invention will be described in detail with reference to the accompanying drawings.

FIG. 1 is an operation flowchart of a general appearance inspection method.

A general appearance inspection method for a part or a product may include image pre-processing process (S11), defective candidate extraction process (S12), image post-processing process (S13), and defect determination process (S14).

Parts/products subject to inspection may be acquired as image data through an imaging device (photography device), which is an optical system, and one or more objects related to a plurality of parts/products may be included in one image.

The image pre-processing process (S11) is a process of emphasizing features of an image of a target object to facilitate inspection before inspection, and methods such as binarization and normalization may be used as image pre-processing. The image pre-processing process may also include overall amplification of brightness of the image for the target object.

In the defective candidate extraction process (S12), a group of candidates suspected to be defective is extracted from a plurality of objects included in a detected image. Objects with potential defective characteristics appearing in the image may be selected as candidates.

In the image post-processing process (S13), feature values of defective candidates are extracted. Here, feature values may be values related to brightness (intensity), shape, texture, etc. of objects included in the image.

In the defect determination process (S14), the extracted feature values are analyzed to determine whether a defect or anomaly has occurred in the product/part related to the object.

In the general appearance inspection method described above, the brightness amplification included in the image pre-processing process is performed by randomly amplifying the overall brightness of the image. According to this method, the brightness of the image may not be uniformly corrected to a desired brightness, and thus, the brightness correction value must be adjusted differently for each image.

As a result, when the brightness changes due to the end of the life of lighting or when there is a deviation in color of some of the cell materials, inspection results according to a conventional method may be changed, and thus, proper inspection results cannot be obtained.

Figure 2:
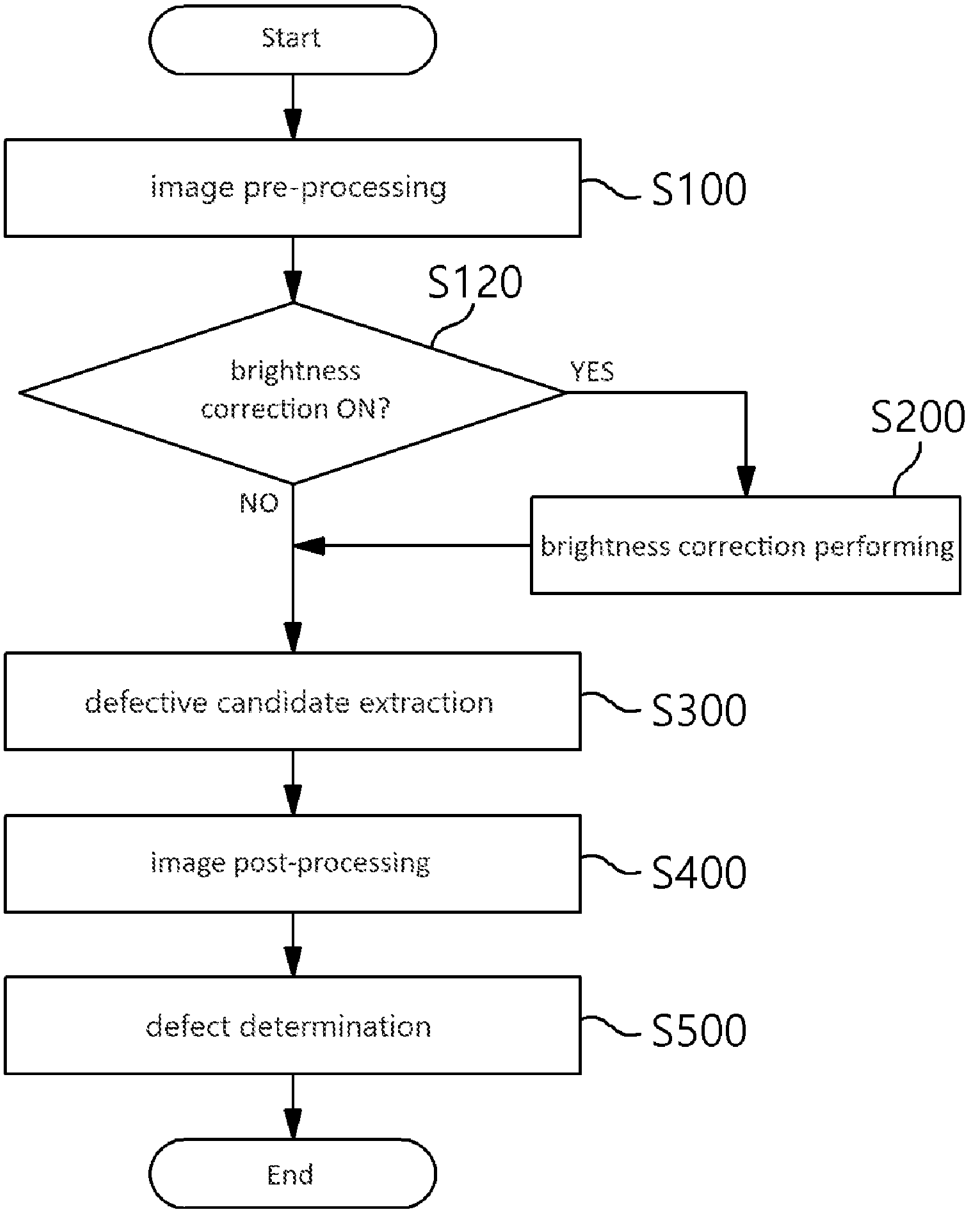
FIG. 2 is an operation flowchart of an appearance inspection method according to embodiments of the present invention.

FIG. 2 is an operation flowchart of an appearance inspection method according to embodiments of the present invention.

The appearance inspection method of a product according to embodiments of the present invention may include image pre-processing process (S100), brightness correction process (S200), defective candidate extraction process (S300), image post-processing process (S400), and defect determination process (S500).

Images of parts/products subject to inspection may be acquired through an imaging device, which is an optical system, and one or more objects related to a plurality of parts/products may be included in one image.

The image pre-processing process (S100) is a process of emphasizing features of an image of the target object to facilitate inspection before inspection and converting the image acquired through the imaging device through the process of correcting or compositing so that defects can be easily identified. The preprocessing process may use methods such as image synthesis, binarization, normalization, blur processing, and stretching.

Here, image synthesis may be particularly useful for detecting defects such as dents and scratches by representing a sense of depth in the image using a multi-channel image, which will be discussed later. In particular, photometric stereo synthesis and phase shift synthesis may be used as image synthesis methods.

In addition, binarization is a process that resets pixel values of object and background in an image to only two values, which are 1 and 0. Through image correction using binarization, defects in appearance of a product may be converted to be clearly visible. Furthermore, normalization is a process that makes pixel values which are concentrated in a specific part of an image evenly distributed over the entire area. Blur processing may also be called smoothing and can be used to smooth out rough images or as a preprocessing process to remove the effects of noise present in the image. In addition, stretching may be used as a preprocessing method to compensate for distorted images.

According to embodiments of the present invention, the brightness correction process (S200) may be applied to a preprocessed image and the brightness correction process (S200) may be executed according to a user's needs. In other words, referring to FIG. 2, the brightness correction process (S200) may be performed in the instance that the brightness correction process is set to ON (example of S120). In the brightness correction process (S200), an average brightness of a region of interest may be calculated and the region of interest may be corrected to specified brightness. Here, the Region of Interest (ROI) may represent an area where actual inspection is to be performed in the inspection image.

Meanwhile, the process of performing brightness correction on a color image according to embodiments of the present invention may be implemented in two ways.

The first method is to change a color image to a black and white image, which means changing a color image to a gray image and setting a target intensity to correct brightness.

The second method is to correct brightness by setting a target brightness for each RGB channel in the color image. In other words, the target brightness may be set separately for Red (R) channel, Green (G) channel, and Blue (B) channel of the color image and the brightness may be corrected for each channel. Here, the processes for calculating the average brightness, calculating the gain value, and calculating the corrected brightness value for each pixel may be separately performed for each channel.

In the defective candidate extraction process (S300), a group of candidates suspected to be defective is extracted from a plurality of objects included in the detected image. Objects with potential defective characteristics appearing in the image may be selected as candidates.

In the defective candidate extraction process (S300), a group of defective candidates may be extracted using the brightness difference within the brightness-corrected region of interest (ROI). For example, a defective candidate group may be extracted by determining whether each pixel in the ROI expressed in grayscale has brightness above a certain threshold or not and distinguishing whether it is a shade area or not.

Here, various techniques such as adaptive, dynamic, polar, and local threshold techniques may be used as examples of threshold techniques.

The image post-processing process (S400) is a process of extracting feature values of defective candidates, and quantitatively calculates representative features such as brightness, shape, size of the extracted defective candidates. In other words, the feature values of the defective candidate group may be values related to intensity, shape, texture, etc. of objects included in the image.

In more detail, the feature values for defective candidates may include area, width, height, circularity, rectangularity, and struct factor of the shape. Regarding the length or size of the defect, the size of the defective candidate group may be determined by an outer diameter of the maximum circumscribed circle or by using area of the defect. In general, foreign matter or contamination has a characteristic of appearing dark in brightness compared to its surrounding area. Thus, this characteristic may be used to extract a corresponding area and the size and area of the dark area may be used to determine whether it is defective. For example, since scratches or chafing marks have a straight shape, the scratches or chafing marks can be distinguished from foreign substances, such as strings, by using a structure factor (struct factor) that quantifies the characteristics of a straight line.

In the subsequent defect determination process (S500), the extracted feature values are analyzed and it is determined whether a defect or anomaly has occurred in a product/part related to the object according to a predetermined detection standard.

Figure 3:
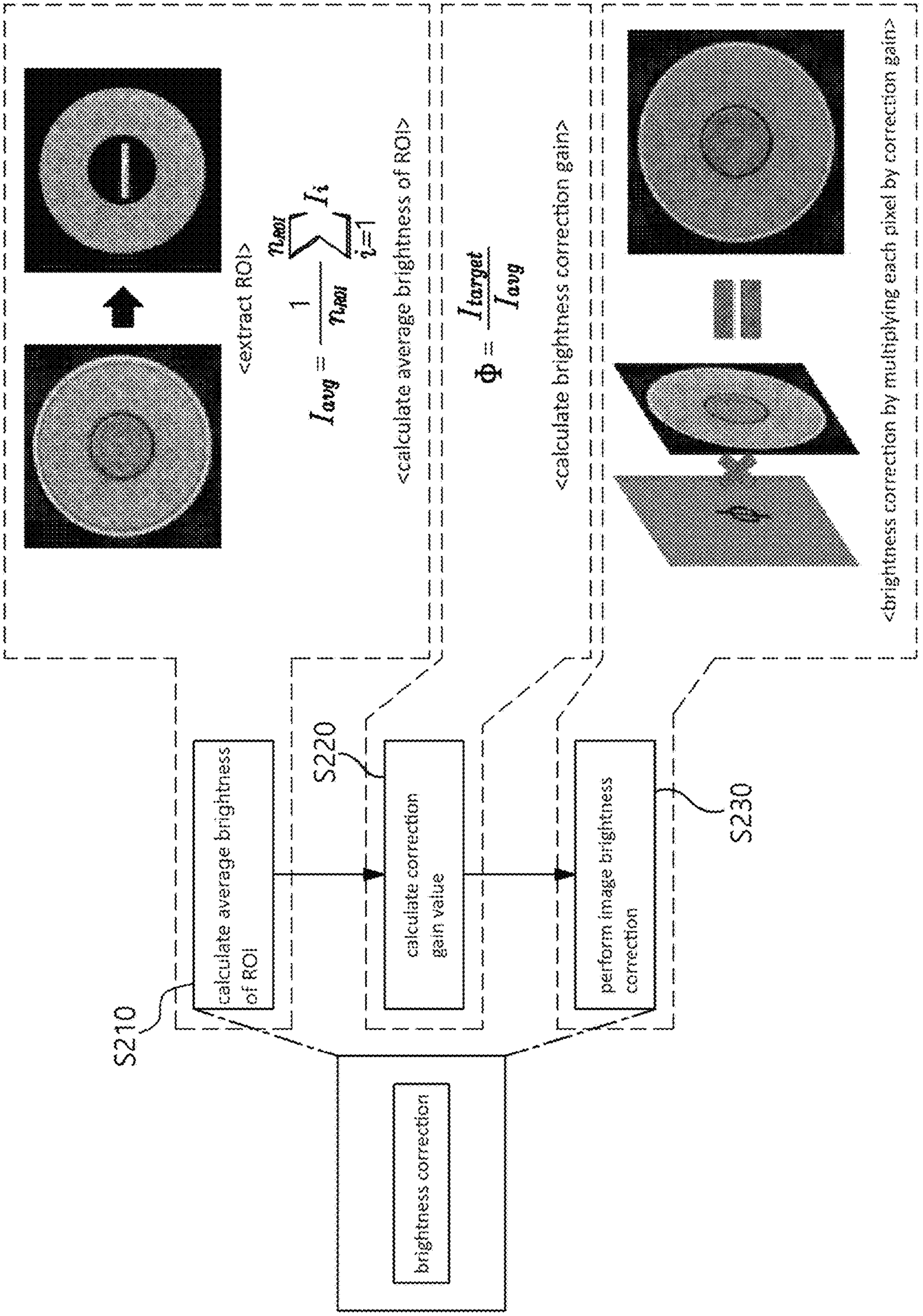
FIG. 3 is a diagram showing a detailed process of brightness correction according to embodiments of the present invention.

FIG. 3 is a diagram showing a detailed process of brightness correction according to embodiments of the present invention.

A region of interest (ROI) is extracted from the captured image and average brightness of pixels within the extracted region of interest is calculated (S210). The average brightness of pixels within the region of interest may be calculated according to Equation 1 below.

$$I_{avg} = \frac{1}{n_{ROI}} \sum_{i=1}^{n_{ROI}} I_i \qquad \text{[Equation 1]}$$

In Equation 1, $I_{avg}$ represents the average brightness of pixels in the region of interest, $I_i$ represents brightness of the ith pixel, and $n_{ROI}$ represents a number of pixels in the ROI.

Once the average brightness of the region of interest is calculated, a correction gain value may be calculated by considering target brightness (S220). The correction gain value may be calculated according to Equation 2 below. Here, the target brightness $I_{target}$ may be predefined by a user.

$$\phi = \frac{I_{target}}{I_{avg}} \qquad \text{[Equation 2]}$$

In Equation 2, $\phi$ represents the brightness correction gain, and $I_{target}$ represents the correction target brightness, which may be defined in advance by a user and re-set through a user interface.

Afterwards, image brightness correction may be performed by multiplying the original brightness value of each pixel by the correction gain value to obtain a corrected brightness value for each pixel (S230).

On the other hand, when correcting brightness by setting correction target brightness for each R, G, B channel in a color image, the average brightness calculation process, the gain value calculation process and the corrected brightness value calculation process for each pixel may be performed separately for each channel (Red (R) channel, Green (G) channel, Blue (B) channel).

Figure 4:
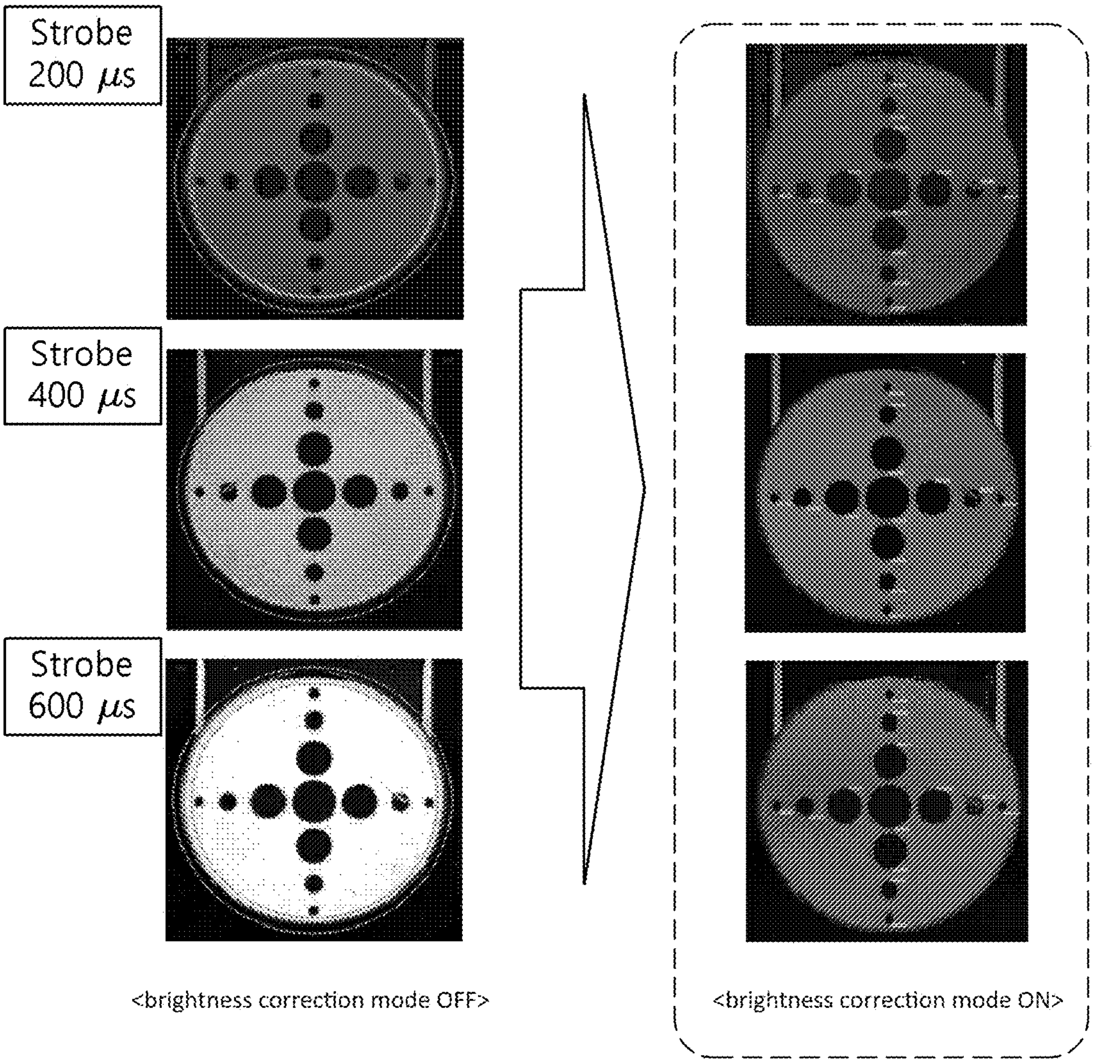
FIG. 4 is a diagram showing an image resulting from brightness correction according to embodiments of the present invention compared with the original image.

FIG. 4 is a diagram showing an image resulting from brightness correction according to embodiments of the present invention compared with the original image.

The object of the appearance inspection according to the present invention may be cylindrical, pouch-shaped, or square-shaped batteries, especially, cylindrical batteries of various specifications. As an example, a cylindrical battery may include an electrode assembly, a battery can, a cap having a plate shape, and a terminal. The cylindrical battery may additionally include an insulating gasket, a current collector plate, an insulator, a sealing gasket, etc.

The images shown in FIG. 4 are obtained, for experiment, by photographing circular patterns of various sizes printed on the upper surface of a cylindrical battery specimen for creating a contamination effect.

In FIG. 4, the three images on the left show images captured with different brightnesses of illumination, i.e., 200 μS of strobetime, 400 μS of strobetime, and 600 μS of strobetime, in the instance that brightness correction according to the present invention is not used (i.e., brightness correction mode OFF). The three images on the right show images captured at different brightnesses of lighting in the instance that brightness correction according to the present invention is used (i.e., brightness correction mode ON). Here, the strobetime is a unit representing time during which the light is turned on, and as the value of the strobetime increases, the time during which the light is turned on increases.

The brightnesses of three captured images on the left that do not use brightness correction mode are proportional to strobe time values. In other words, the three images on the left did not use the brightness correction mode, so the difference in brightness between the three images is clearly visible. On the other hand, in the case of the three images on the right where brightness correction is performed according to the present invention, the brightness difference among the three images is so small that the difference cannot be identified with the naked eye.

Figure 5:
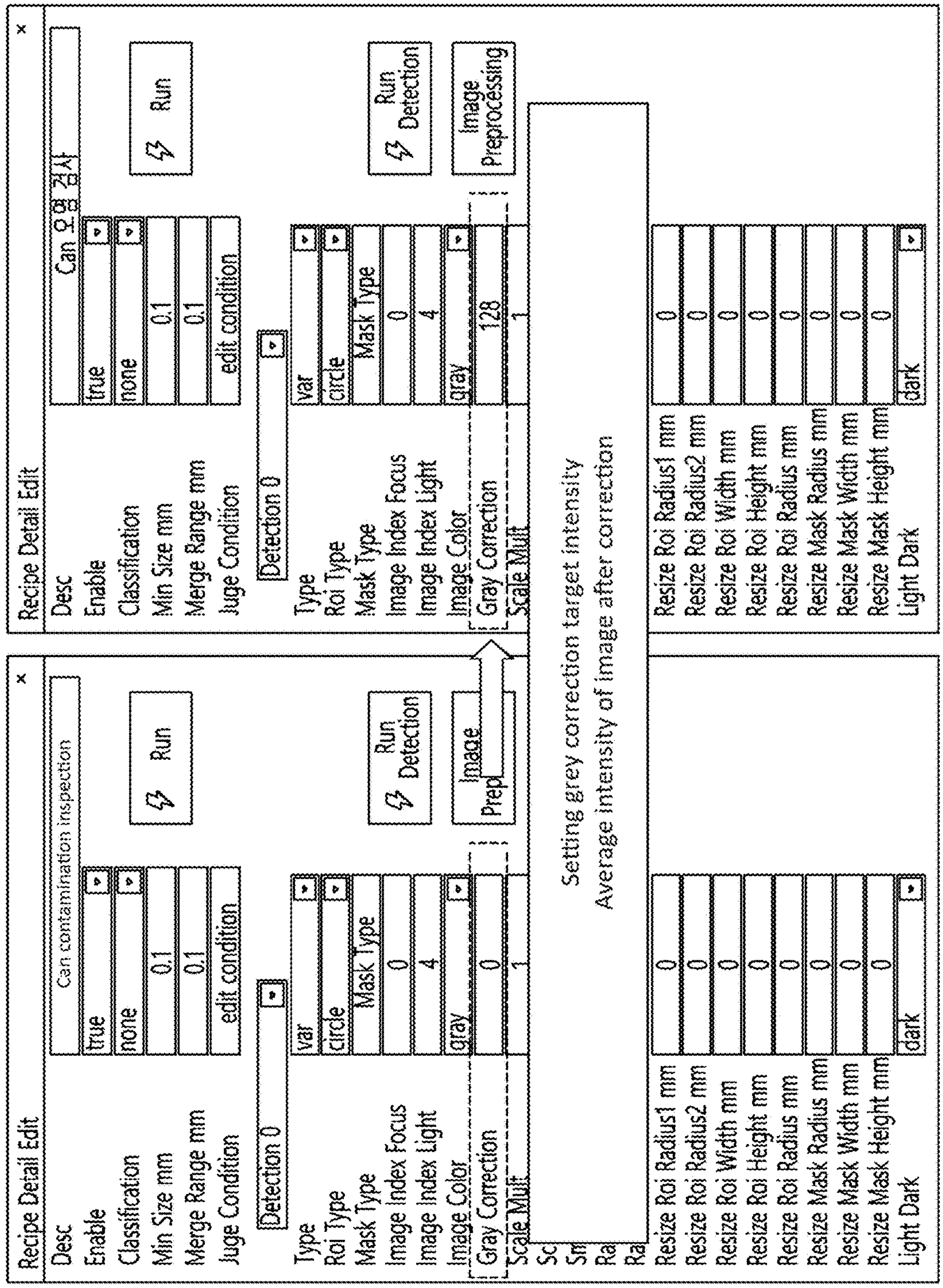
FIG. 5 is an example of a user interface screen provided for appearance inspection according to embodiments of the present invention.

FIG. 5 is an example of a user interface screen provided for appearance inspection according to embodiments of the present invention.

The appearance inspection apparatus according to embodiments of the present invention may provide a user interface by which inspection-related details can be set. Inspection-related details may include an object/product to be inspected, whether or not brightness correction is performed, and intensity of brightness correction.

The appearance inspection shown in the user interface screen of FIG. 5 is a contamination inspection of a battery can, and a user may directly set items such as whether brightness correction is performed and target intensity (gray correction target intensity).

FIGS. 6A to 6C are graphs comparing appearance inspection results using an image with brightness correction according to embodiments of the present invention and an image without brightness correction.

FIG. 6A shows inspection results for an upper plane of the battery, FIG. 6B shows inspection results for an lower plane of the battery, and FIG. 6C shows inspection results for a lateral side of the battery.

The experiments shows that a measurement error (unit: mm) is improved in all three cases when automatic brightness correction is performed (green graph) compared to when automatic brightness correction is not performed (red graph), which presents a improvement effect of 60% on average.

FIG. 7 shows images measured and processed with various illumination intensities and various correction target brightnesses according to embodiments of the present invention.

More specifically, FIG. 7 shows resulting images of multiple contaminants of various sizes randomly placed on the upper surface of a cylindrical battery for experiment under three illumination intensities (strobe time 200 μS, strobe time 400 μS, strobe time 600 μS), and different correction target brightness (correction mode OFF, correction target 64, 128, 192).

For images that do not use brightness correction mode, the strobe time value is proportional to the brightness of the captured image. In cases where brightness correction according to the present invention is used, it can be understood that the image brightness after correction has been adjusted within a certain range.

FIG. 8 is a graph showing detection size deviation between the contamination size detected by performing brightness correction according to the present invention and the inspection result through a microscope.

More specifically, FIG. 8 shows differences between measurement inspection results using a microscope and the sizes of contamination detected by performing brightness correction according to embodiments of the present invention on images of a number of contaminations (pollutions 1 to 25) randomly set and placed for the experiment.

The example in FIG. 8 shows a case where brightness correction using gray scale is used among the brightness correction techniques. Three graphs show the deviation of the contamination size when the target brightness of brightness correction is set to 128, 64, and 192, respectively, compared to the contamination size measured through a microscope. FIG. 8 also shows the contamination size deviation when brightness correction is not used (Gray Correction OFF) as a comparative example. Comparing the graphs in FIG. 8, it is understood that when brightness correction is used, that is, when gray correction is used (Gray Correction ON), level of deviation in size of detected contamination is reduced. In addition, as a result of conducting an experiment by setting the target brightness to various values, it is understood that brightness values of 64 to 192 is an appropriate use range.

FIG. 9 is a perspective view of an imaging device according to embodiments of the present invention and FIG. 10 is a cross-sectional view of an imaging device according to embodiments of the present invention.

Referring to FIGS. 9 and 10, the imaging device 200 according to embodiments of the present invention may include at least one of a housing 210, a first lighting 220, a first mirror 231, a second mirror 232, and a camera (240), a third mirror 250, a second lighting 260, a transfer means 270, and a reversing means 280.

In the example of FIG. 9, the housing 210 is disposed on a side of the battery 10 and surrounds at least the first area A1 of the battery 10. For example, as shown in FIG. 9, the battery 10 may be placed in a lying position with its side facing upward, and the housing 210 may be placed above of the battery 10. The shape of the housing 210 is not limited to a particular shape, but the inner surface of the housing 210 may have a dome shape.

The first lighting 220 is disposed on the inner surface of the housing 210 and radiates light to the battery 10. In FIG. 10, the first lighting 220 is shown as being protruding and disposed on the inner surface of the housing 210. However, the first lighting 220 may be embedded in the inner surface of the housing 210 and arranged so that at least a portion of the first lighting is exposed. Specifically, the first lighting 220 may radiate light to a lateral side of the battery 10. The first lighting 220 may radiate light to the entire first area A1 of the battery 10. As described above, the inner surface of the housing 210 may have a dome shape and the first lighting 220 disposed on the inner surface of the housing 210 may be arranged in an overall round shape to emit light to the lateral side of the battery 10.

The first mirror 231 and the second mirror 232 may be disposed on both sides of the battery 10 to reflect a portion of the first area A1 of the battery 10, respectively. Referring to FIG. 10, a first mirror 231 may be disposed on the left side of the battery 10 and a second mirror 232 may be disposed at an angle on the right side of the battery 10.

Meanwhile, the camera 240 photographs at least a portion of the first area A1 of the battery 10, an image reflected on the first mirror 231, and an image reflected on the second mirror 232. In other words, the camera 240 photographs at least a portion of the first area A1 of the battery 10. Here, a portion of the first area A1 reflected in the first mirror 231 or the second mirror 232 include all areas, in the first area A1, that cannot be photographed with the camera 240 if either of the first mirror 231 and the second mirror 232 is not disposed. Accordingly, the image captured by the camera 240 may include an image of the entire first area A1 of the battery 10 due to the presence of the first mirror 231 and the second mirror 232. Through this, the imaging device 200 according to the present invention may perform side inspection of the battery by acquiring an appearance image of the entire area of the first area A1, which is more than half of the lateral side of the battery 10, at once, without rotating or rolling the battery 10.

Meanwhile, the imaging device 200 may further include a third mirror 250 if the camera 240 is not properly disposed facing the side 200S of the battery 10 enough to directly photograph at least a portion of the first area A1 of the battery 10, an image reflected by the first mirror 231, and an image reflected by the second mirror 232. Here, the camera 240 may indirectly capture at least a portion of the first area A1, the image reflected in the first mirror 231, and the image reflected in the second mirror 232 by photographing an image reflected in the third mirror 250. In other words, the camera 240 may capture at least a portion of the first area A1 of the battery 10 reflected in the third mirror 250, the image reflected in the first mirror 231, and the image reflected in the second mirror 232.

The third mirror 250 may be disposed at an angle on a side 200S of the battery 10, reflecting at least a portion of the first area A1 of the battery 10, an image reflected by the first mirror 231, and an image reflected by the second mirror 232. In reference to the drawing, the third mirror 250 may be tilted and disposed to face between the Y direction (Y) and the Z direction (Z). The third mirror 250 may be arranged such that at least a portion of the first area A1 of the battery 10, the image reflected on the first mirror 231 and the image reflected on the second mirror 232 are incident and reflected at an angle of about 45°. Here, the camera 240 may be placed facing the light reflected in the third mirror 250.

Meanwhile, the imaging device 200 may include a second lighting 260 in addition to the first lighting 220. The second lighting 260 may be disposed on the third mirror 250 and radiate light to the battery 10, and may be a coaxial lighting.

In addition, the transfer means 270 may transfer the battery 10 in the axial direction (X) of the battery 10 so that the battery 10 passes through the housing 210. The battery 10 may be transported through the transfer means 270, reach the inspection area within the housing 210, stop for a certain period of time, and may be photographed by the camera 240 so that a side inspection of the battery 10 can be performed. The battery 10 on which the inspection has been done may be transferred to a subsequent process through the transfer means 270.

Meanwhile, the reversing means 280 may overturn the battery 10 which has been photographed by the camera 240. In other words, the reversing means 280 may rearrange the battery 10 in a 180° rotated state. Referring to the drawings, the reversing means 280 may turn the battery 10 upside down in the Z direction (Z). Accordingly, the side inspection may be performed on the opposite side of the battery 10 on which the side inspection has not been performed using the same device as the above-described imaging device 200. Since the first area A1 being inspected is more than half of the side 200S of the battery 10, some of the inspection areas may overlap during the first side inspection and second side inspection.

Here, the side inspection of the opposite side of the battery 10 on which the side inspection has not been performed may be performed using a separate imaging device 200 to ensure a smooth flow of the process. In other words, the imaging device 200 may include a pair of imaging devices 200 for inspecting both sides of the battery 10, respectively. However, in order to reduce costs, a side inspection may be performed on both sides of the battery 10 using a single imaging device 200.

Meanwhile, when inspecting lateral side appearance of a cylindrical battery, images are acquired by rotating or rolling the battery 360° in general. When the battery is rotated or rolled, noise in the images occurs, which lowers image quality and detection power of the inspection device. Additionally, the farther away from the center of photographing, the more difficult to secure visibility of defects due to shadows caused by a curved surface.

The imaging device 200 according to embodiments of the present invention include a first mirror 231 and a second mirror 232, thereby obtaining entire image of the first area A1, which is more than half of the side 200S of the battery 10, through one shot. In other words, it is possible to inspect the entire surface of the side of the battery 10 by performing two inspections on one side and the other side of the battery 10. In addition, sufficient visibility of defects can be secured even in areas far from the center of the first area A1 for inspection. Through this, it is possible to provide an imaging device that can inspect the side appearance of a cylindrical battery without rotating or rolling it. Additionally, it is possible to provide an imaging device that can prevent image noise and improve image quality and detection power of the inspection device.

Meanwhile, the imaging device according to the embodiment described with reference to FIGS. 9 and 10 has a structure suitable for inspecting a lateral side of a battery and is presented as an example of the imaging device according to embodiments of the present invention.

FIG. 11A is a diagram showing the appearance of an imaging device according to another embodiment of the present invention and FIG. 11B is a diagram showing a multi-channel lighting configuration of an imaging device according to another embodiment of the present invention.

The imaging device shown in FIG. 11A has a structure suitable for acquiring images of the upper surface and lower surface of the battery, such as the rivets and vents of a battery cell and uses a multi-lighting device as shown in FIG. 11B. Various images under various lighting conditions can be acquired using the multi-lighting device shown in FIG. 11B. Here, the multi-lighting device may include, for example, dome lighting, low angle lighting, coaxial lighting, ring lighting, and dark field lighting. As described above, the imaging device according to the present invention may include structures for capturing images of various parts of the battery cell, such as the top and bottom surfaces of the battery and the side surface of the battery.

Figure 12:
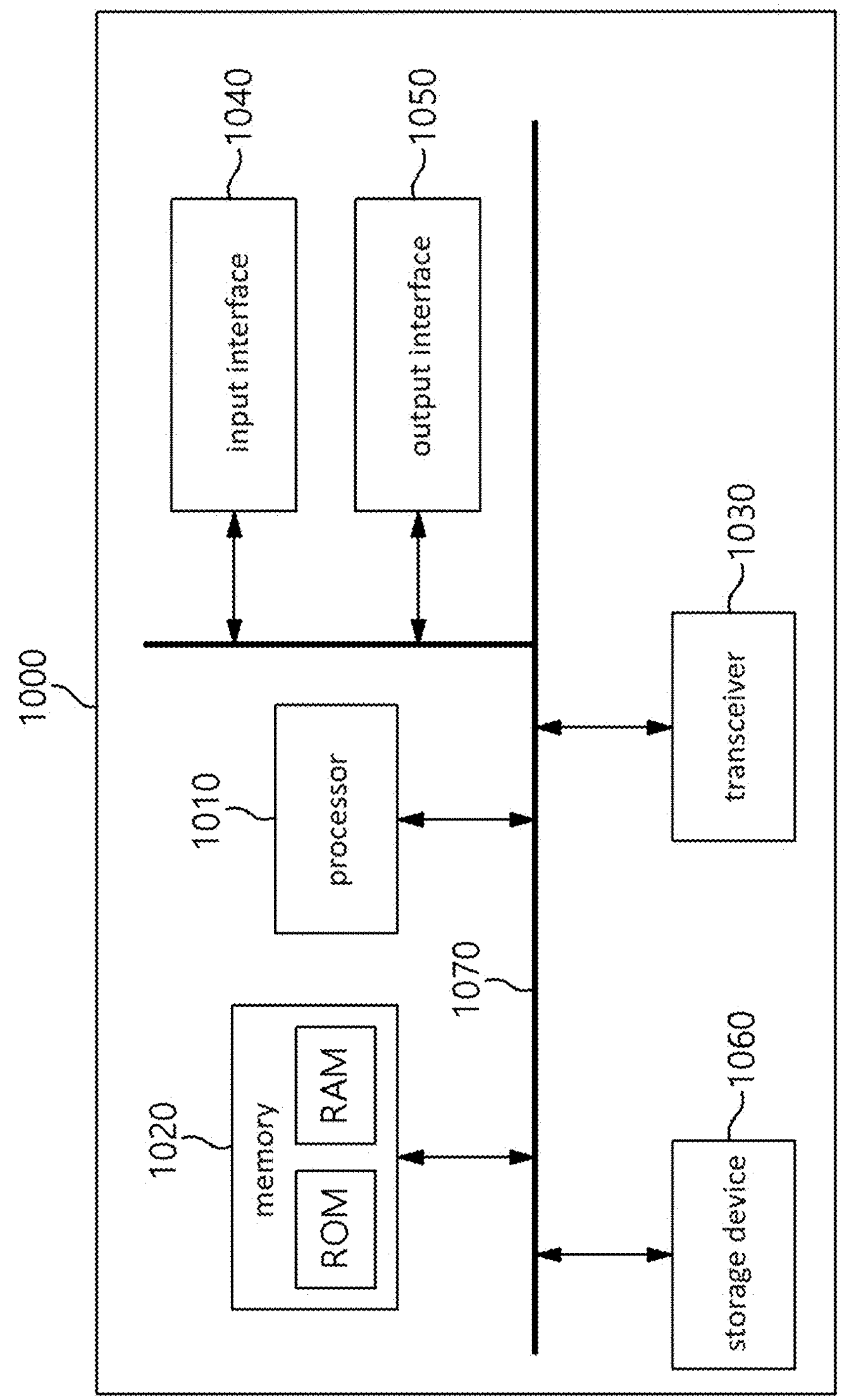
FIG. 12 is a block diagram of an appearance inspection apparatus according to embodiments of the present invention.

FIG. 12 is a block diagram of an appearance inspection apparatus according to embodiments of the present invention.

The appearance inspection apparatus 1000 according to embodiments of the present invention may include at least one processor 1010, a memory 1020 that stores at least one command executed through the processor, and a transceiver 1030 that is connected to a network and performs communication.

Here, the at least one instruction may include an instruction to obtain and pre-process an image of appearance of a target object; an instruction to extract a region of interest from the preprocessed image and to perform brightness correction on the extracted region of interest; an instruction to extract defective candidates from the brightness-corrected image; an instruction to perform image post-processing on the extracted defective candidates; and an instruction to determine whether the target object is defective from the post-processed image.

The appearance inspection apparatus according to embodiments of the present invention may cooperate with an an imaging device capturing appearance of the target object, or the appearance inspection apparatus may include the imaging device. The imaging device according to embodiments of the present invention may be provided in the same or similar form as the devices shown in FIGS. 9, 10, 11*a*, and 11*b*.

The instruction to perform brightness correction on the extracted region of interest may include an instruction to calculate an average brightness of pixels within the extracted region of interest; an instruction to calculate a correction gain value based on the calculated average brightness and target brightness; and an instruction to correct brightness of each pixel according to the correction gain value.

The instruction to calculate a correction gain value based on the calculated average brightness and target brightness may include an instruction to calculate the correction gain value by dividing the target brightness by the average brightness.

The instruction to correct brightness of each pixel according to the correction gain value may include an instruction to multiply original brightness of each pixel by the correction gain value to correct the brightness of each pixel. The instruction to calculate the average brightness of pixels within the extracted region of interest may include an instruction to calculate the average brightness based on the number of pixels in the region of interest and brightness of each pixel.

The target brightness may be determined by a user.

Meanwhile, the instruction to perform brightness correction on the extracted region of interest may include an instruction to change a captured color image to a gray image before applying brightness correction to the captured color image.

The instruction to perform brightness correction on the extracted region of interest may include an instruction to separate the color image into R channel, G channel, and B channel, before applying brightness correction to a captured color image.

Therefore, the instruction to calculate the average brightness of pixels, the instruction to calculate the correction gain value, and the instruction to correct the brightness of each pixel may be performed for each of the R channel, G channel, and B channel.

The appearance inspection apparatus 1000 may further include an input interface device 1040, an output interface device 1050, a storage device 1060, etc. Respective components included in the appearance inspection apparatus 1000 may be connected by a bus 1070 and can communicate with each other.

The storage device 1060 may store at least one image produced in each step of the inspection method according to the present invention, such as a plurality of images captured by the imaging device, pre-processed images, and post-processed images. The image stored in the storage device 1060 may be provided to at least one processor 1010 when necessary during execution of the inspection method according to the present invention.

Here, the processor 1010 may mean a central processing unit (CPU), a graphics processing unit (GPU), or a dedicated processor on which methods according to embodiments of the present invention are performed. The memory (or storage device) may include at least one of a volatile storage medium and a non-volatile storage medium. For example, the memory may include at least one of read only memory (ROM) and random access memory (RAM).

The operations of the method according to the embodiments of the present invention may be implemented as a computer-readable program or code on a computer-readable recording medium. The computer-readable recording medium includes all types of recording devices in which data readable by a computer system is stored. In addition, the computer-readable recording medium may be distributed in a network-connected computer system to store and execute computer-readable programs or codes in a distributed manner.

Although some aspects of the invention have been described in the context of the apparatus, it may also represent a description according to a corresponding method, wherein a block or apparatus corresponds to a method step or feature of a method step. Similarly, aspects described in the context of a method may also represent a feature of a corresponding block or item or a corresponding apparatus. Some or all of the method steps may be performed by (or using) a hardware device, such as, for example, a microprocessor, a programmable computer, or an electronic circuit. In some embodiments, one or more of the most important method steps may be performed by such an apparatus.

In the forgoing, the present invention has been described with reference to the exemplary embodiment of the present invention, but those skilled in the art may appreciate that the present invention may be variously corrected and changed within the range without departing from the spirit and the area of the present invention described in the appending claims.

The invention claimed is:

1. An appearance inspection method of a product, the method comprising:

obtaining an image of appearance of a target object;

pre-processing the image;

extracting a region of interest from the pre-processed image;

changing the extracted region of interest to a gray image;

obtaining a brightness-corrected image by performing brightness correction on the gray image of the extracted region of interest;

extracting defective candidates from the brightness-corrected image;

obtaining a post-processed image by post-processing the extracted defective candidates; and determining whether the target object is defective based on the post-processed image.

2. The method of claim 1, wherein obtaining the brightness- corrected image includes:

calculating an average brightness of pixels within the extracted region of interest;

calculating a correction gain value based on the calculated average brightness and target brightness; and correcting brightness of each pixel according to the correction gain value.

3. The method of claim 2, wherein calculating the correction gain value is performed by dividing the target brightness by the average brightness.

4. The method of claim 2, wherein correcting the brightness of each pixel according to the correction gain value includes:

multiplying original brightness of each pixel by the correction gain value to correct the brightness of each pixel.

5. The method of claim 2, wherein the target brightness is based on a user input.

6. The method of claim 2, wherein calculating the average brightness of the pixels within the extracted region of interest is based on a number of pixels in the region of interest and the brightness of each pixel.

7. An appearance inspection method of a product, the method comprising:

obtaining an image of appearance of a target object;

pre-processing the image;

extracting a region of interest from the pre-processed image;

separating the extracted region of interest into R channel, G channel, and B channel;

obtaining a brightness-corrected image by performing brightness correction on the extracted region of interest, based on calculating an average brightness of pixels, calculating a correction gain value, and correcting the brightness of each pixel separately for each of the R channel, G channel and B channel;

extracting defective candidates from the brightness-corrected image;

obtaining a post-processed image by post-processing the extracted defective candidates; and determining whether the target object is defective based on the post-processed image.

8. An appearance inspection apparatus, the apparatus comprising:

at least one processor; and memory having programmed thereon instructions that, when executed, cause the at least one processor to:

obtain an image of appearance of a target object;

pre-process the image;

extract a region of interest from the preprocessed image;

change the extracted region of interest to a gray image;

obtain a brightness-corrected image by performing brightness correction on the gray image of the extracted region of interest;

extract defective candidates from the brightness-corrected image;

obtain a post-processed image by performing image post-processing on the extracted defective candidates; and determine whether the target object is defective based on the post-processed image.

9. The apparatus of claim 8, wherein the apparatus is configured to communicate with a remote imaging device capturing appearance of the target object, or wherein the imaging device is embedded in the apparatus.

10. The apparatus of claim 8, wherein the instructions are further configured to cause the at least one processor to:

calculate an average brightness of pixels within the extracted region of interest;

calculate a correction gain value based on the calculated average brightness and target brightness; and correct brightness of each pixel according to the correction gain value.

11. The apparatus of claim 10, wherein the correction gain value is calculated based on dividing the correction gain value by the target brightness by the average brightness.

12. The apparatus of claim 10, wherein the brightness of each pixel is corrected by:

multiplying original brightness of each pixel by the correction gain value.

13. The apparatus of claim 10, wherein the target brightness is based on a user input.

14. The apparatus of claim 10, wherein the average brightness of pixels within the extracted region of interest is calculated based on the average brightness based on a number of pixels in the region of interest and the brightness of each pixel.

15. An appearance inspection apparatus, the apparatus comprising:

at least one processor; and memory having programmed thereon instructions that, when executed, cause the at least one processor to:

obtain an image of appearance of a target object;

pre-process the image;

extract a region of interest from the preprocessed image;

separate the extracted region of interest into R channel, G channel, and B channel;

obtain a brightness-corrected image by performing brightness correction on the extracted region of interest, based on calculating an average brightness of pixels, calculating a correction gain value, and correcting the brightness of each pixel separately for each of the R channel, G channel and B channel;

extract defective candidates from the brightness-corrected image;

obtain a post-processed image by performing image post-processing on the extracted defective candidates; and determine whether the target object is defective based on the post-processed image.

* * * * *